United States Patent [19]

Pickard

[11] 4,266,910

[45] May 12, 1981

[54] PIPE POSITIONER BOOM AND HEAD ASSEMBLY FOR PIPE LAYING FRAME

[75] Inventor: Kenneth L. Pickard, Tulsa, Okla.

[73] Assignee: Pickard Equipment, Inc., Rochester, N.Y.

[21] Appl. No.: 72,215

[22] Filed: Sep. 4, 1979

[51] Int. Cl.³ ............................................. B25J 3/00
[52] U.S. Cl. ................................... 414/735; 294/88; 414/740; 414/718; 414/743
[58] Field of Search ............... 414/718, 729, 732, 735, 414/738, 739, 740, 741, 743, 745, 747; 294/88, 104

[56] References Cited

U.S. PATENT DOCUMENTS

| | | | |
|---|---|---|---|
| 2,698,697 | 1/1955 | Holopainen | 414/695.5 |
| 3,072,268 | 1/1963 | Purtell | 414/747 |
| 3,224,608 | 12/1965 | Yadon et al. | 414/718 |
| 3,298,548 | 1/1967 | Long et al. | 414/718 X |
| 3,330,056 | 7/1967 | Woodside et al. | 414/732 X |
| 3,840,128 | 10/1974 | Swoboda, Jr. et al. | 414/732 X |
| 4,130,204 | 12/1978 | Pickard | 414/561 |

Primary Examiner—Robert J. Spar
Assistant Examiner—Fred A. Silverberg
Attorney, Agent, or Firm—Harvey B. Jacobson

[57] ABSTRACT

An elongated boom including relatively telescoped base and extension sections is provided with the base section pivotally supported from a mount for oscillation relative thereto about a horizontal axis extending transversely of the base section. First motor structure is provided for adjustably extending and retracting the extension section relative to the base section and a second motor structure is operatively connected between the base section and the mount for angularly positioning the base section relative to the mount. A generally horizontal elongated support arm has one end pivotally supported from the extension section free end for oscillation relative thereto about a horizontal axis extending transversely of the arm and extension section and third motor structure is operatively connected between the extension section and the support arm for angularly shifting the latter relative to the former. An elongated follower is mounted on the support arm for adjustable shifting therealong and fourth motor structure is provided for shifting the follower relative to the arm. One end of the follower includes a first elongated depending fixed jaw and the second follower end includes a second elongated depending pivoted jaw. Fifth motor structure is connected between the follower and the second jaw to angularly displace the latter relative to the former.

8 Claims, 6 Drawing Figures

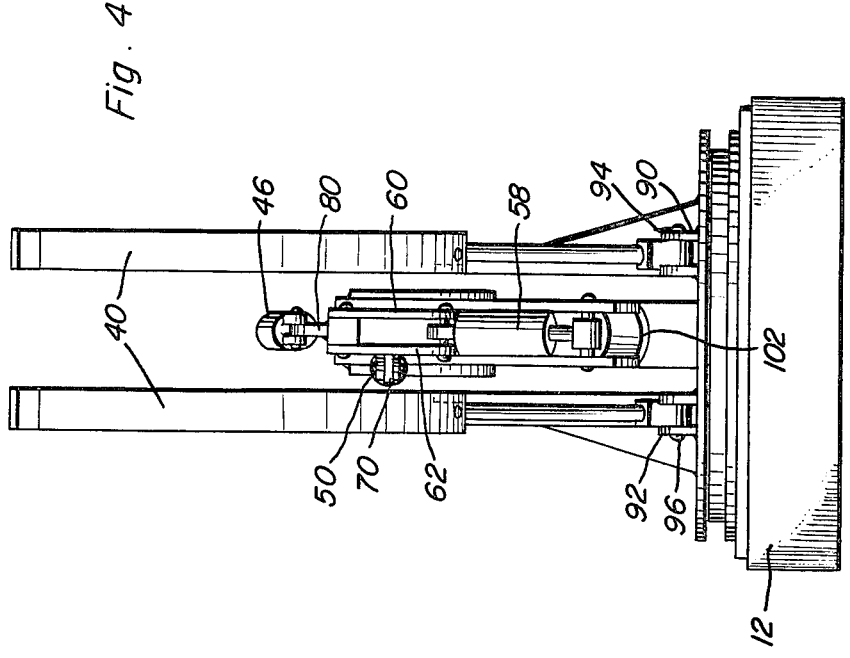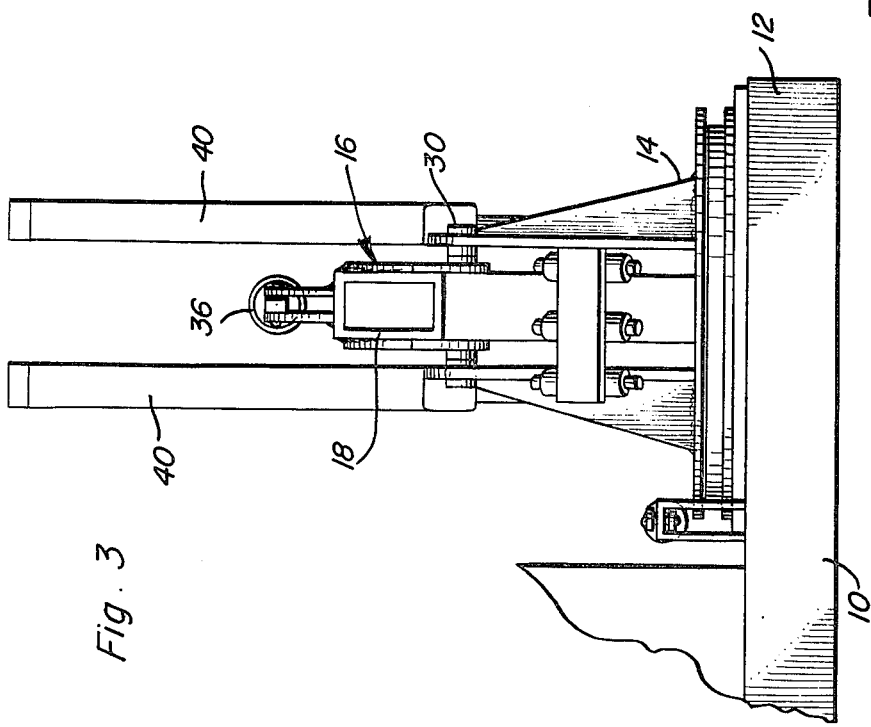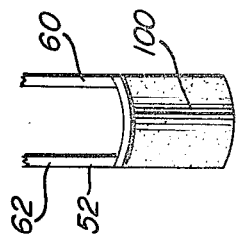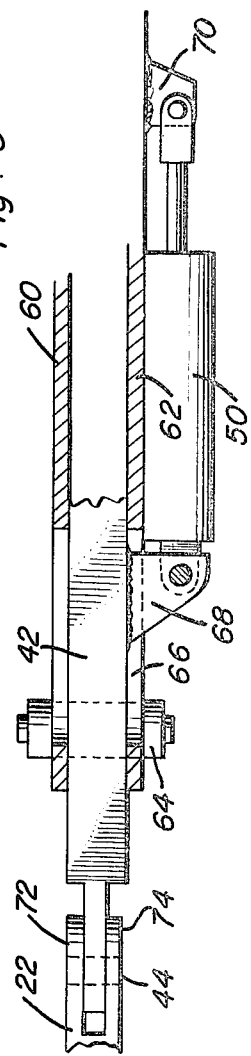

PIPE POSITIONER BOOM AND HEAD ASSEMBLY FOR PIPE LAYING FRAME

BACKGROUND OF THE INVENTION

The grapple crane of the instant invention has been specifically designed for use in conjunction with the pipe laying apparatus disclosed in my prior U.S. Pat. No. 4,130,204. The grapple crane has been specifically designed to provide a crane assembly which may be more advantageously utilized in laying large heavy pipe sections alongside of and on top of the bank a few feet from the open trench. Although various forms of pipe section engaging cranes have been heretofore provided, many of these previously known forms of cranes are not specifically designed for use in the precision type laying operations which may be carried out through the utilization of the apparatus disclosed in my above noted prior patent.

BRIEF DESCRIPTION OF THE INVENTION

The grapple crane of the instant invention is constructed in a manner whereby a pipe section end may be precisely positioned on top of and alongside of and a few feet from the open ditch and parallel thereto for alignment of the supported pipe section in precise position relative to the last positioned pipe section. The grapple crane includes structure whereby slight and precise positioning adjustments of the pipe section supported thereby may be carried out and the grapple is further constructed in a manner whereby it may be readily operated by an operator having only general familiarity with various types of similar cranes.

The main object of this invention is to provide a grapple crane for engaging and supporting pipe sections to be laid on top of and alongside of and a few feet from the open ditch and parallel thereto and which may be operated in a manner to shift the supported pipe section in a precise manner into substantially perfect alignment with the last positioned pipe section in order that the adjacent ends of the last and presently supported pipe sections may be welded together.

Another object of this invention is to provide a grapple crane suitable for operation upon a mobile platform.

Still another important object of this invention is to provide a grapple crane including structural features enabling it to be efficiently operated in substantially all climates.

A still further object of this invention is to provide a grapple crane which may be utilized to grip and support structures other than pipe sections.

An ancillary object of this invention is to provide a grapple crane having relatively great load carrying capacity.

A final object of this invention to be specifically enumerated herein is to provide a grapple crane in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a rear elevational view of the grapple crane;

FIG. 4 is a front elevational view of the grapple crane;

FIG. 5 is an enlarged, fragmentary, horizontal sectional view illustrating the manner in which a fluid motor is operatively connected between the support arm and follower portions of the crane; and FIG. 6 is a fragmentary, enlarged face elevational view of the pipe section engaging portion of one of the grapple crane jaws.

DETAILED DESCRIPTION OF THE INVENTION

Figure 1:
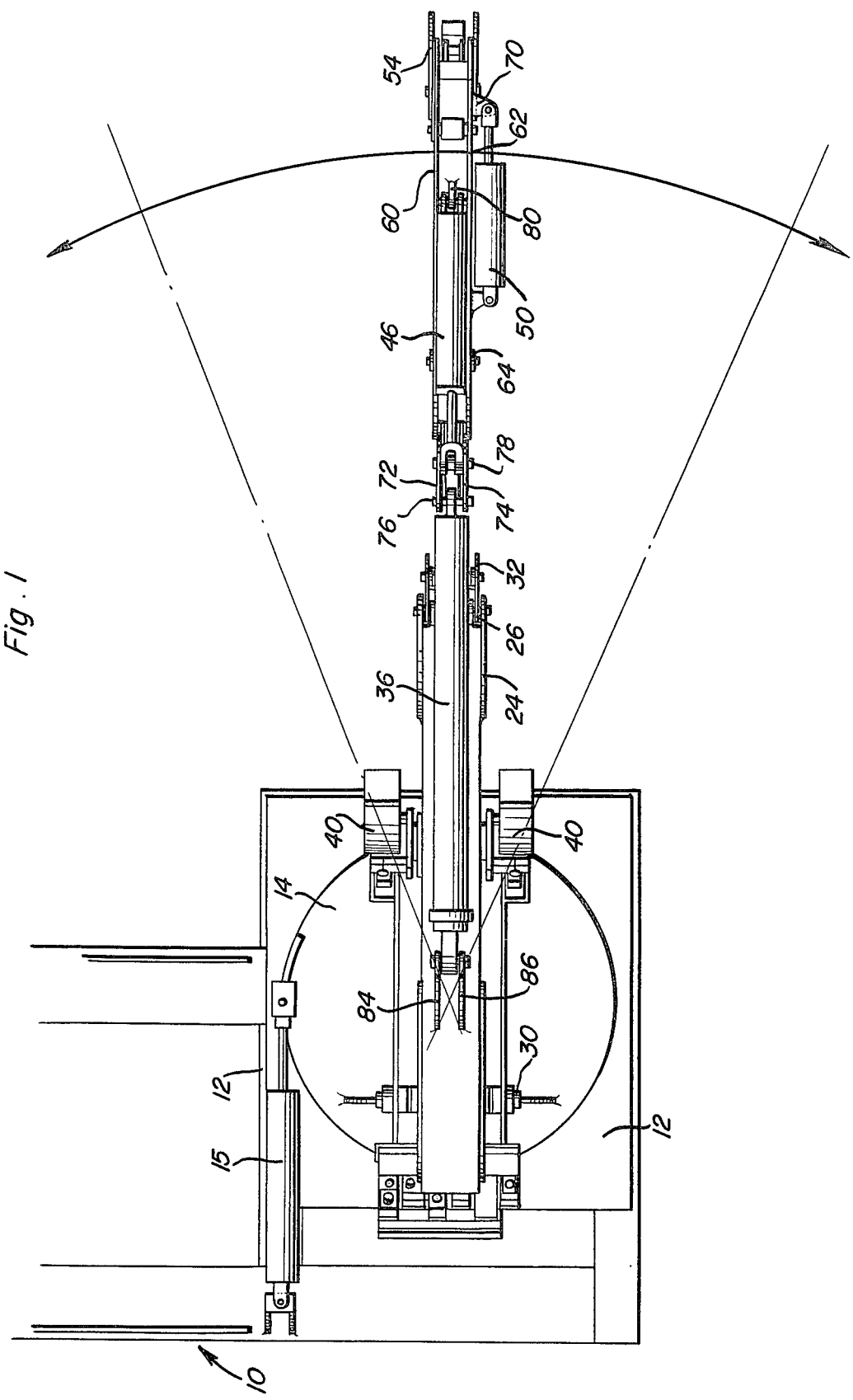
FIG. 1 is a top plan view of the grapple crane of the instant invention.

Referring now more specifically to the drawings, the numeral 10 generally designates a mobile frame for a land vehicle of any suitable type, such as that disclosed in my prior U.S. Pat. No. 4,130,204. The vehicle 10 includes a supporting portion 12 from which a mount 14 is rotatably mounted for angular displacement about a vertical axis. A hydraulic motor 15 is operatively connected between the supporting portion 12 and the mount 14 for adjustably angularly displacing the latter relative to the supporting portion 12. An elongated boom assembly generally referred to by the reference numeral 16 is provided and includes an elongated tubular base section 18, an elongated tubular intermediate section 20 and an extension or free end section 22. The intermediate section 20 is telescoped in and extendible and retractable relative to one end 24 of the base section 18 and the latter includes upper and lower rollers 26 and 28 for rollingly and guidingly supporting the intermediate section 20 for extension and retraction relative to the base section 18. The other end of the base section 18 is pivotally supported from the mount 14 as at 30 for angular displacement about a horizontal axis extending transversely of the base section 18 and the free end section 22 is telescoped into the outer end of the intermediate section 20, the latter including upper and lower rollers 32 and 34 for rollingly and guidingly engaging the free end sections 22.

An elongated fluid motor 36 is operatively connected between the base section 18 and an upstanding portion 38 carried by the outer end of the free end section 22 for extension and retraction of the free end section 22 relative to the intermediate section 20 and also extension and retraction of the intermediate section 20 relative to the base section 18. It is to be noted that the base and intermediate sections 18 and 20 include coacting abutment structure (not shown) for limiting extension of the intermediate section 20 relative to the base section 18 and that the intermediate section 20 and free end section 22 include similar abutment structure limiting extensection 22 include similar abutment structure limiting extension of the free end section 22 relative to the intermediate section 20.

A pair of opposite side fluid motors 40 are operatively connected between the mount 14 and the base section 18 intermediate its opposite ends for annular displacement of the base section 18 about its horizontal axis of oscillation and an elongated support arm 42 has one end thereof oscillatably supported from the outer end of the free end section 22 as at 44 for angular displacement about a horizontal axis extending transversely of the elongated support arm 42 and the free end section 22.

Yet another fluid motor 46 is operatively connected between the upstanding portion 38 carried by the free end section 22 and the outer end portion of the support arm 42 for adjustable angular displacement of the support arm 42 relative to the free end section 22. Also, an elongated follower 48 is mounted on the support arm 42 for adjustable shifting therealong and a fluid motor 50 is operatively connected between the support arm 42 and the follower 48 for adjustably shifting the latter along the support arm 42.

The inner end of the follower 48 includes a depending first jaw 52 rigidly supported therefrom and the outer end of the follower 48 includes a depending second jaw 54 oscillatably supported therefrom as at 56 for angular displacement about a horizontal axis extending transversely of the follower 48 and the second jaw 54. Still another fluid motor 58 is operatively connected between the outer end of the follower 48 and the lower end portion of the second jaw 54 for angular displacement of the latter relative to the follower 48.

The follower 48 includes a pair of opposite side plates 60 and 62 between which upper and lower pairs of longitudinally spaced rollers 64 are journaled and the upper rollers 65 rollingly engage the upper surface of the arm 42 while the lower rollers 64 rollingly engage the under surface of the arm 42. In addition, the upper end of the fluid motor 58 is pivotally connected between the outer ends of the plates 60 and 62 and the plate 62 includes a longitudinal window 66 therein through which a mounting lug 68 carried by the corresponding side of the support arm 42 projects. The fluid motor 50 is operatively connected between the mounting lug 68 and a similar mounting lug 70 carried by the outer side of the outer end of the plate 62.

The upstanding portion 38 is defined by a pair of opposite side plates 72 and 74 between which adjacent ends of the fluid motors 36 and 46 are pivotally anchored as at 76 and 78 and an upstanding mounting lug 80 is carried by an outer end portion of the upper surface of the support arm 42 between the plates 60 and 62 to which the end of the fluid motor 46 remote from the upstanding portion 38 is pivotally connected as at 82.

The base section 18 includes a pair of opposite side upstanding mounting lugs 84 and 86 between which the end of the fluid motor 36 remote from the upstanding portion 38 is pivotally anchored as at 88. In addition, the opposite side fluid motors 40 are pivotally anchored to mounting portions 90 and 92 on opposite sides of the mount 14 as at 94 and 96 and a trunnion assembly 98 is interconnected between the upper extendible portions of the motors 40 and pivotally anchored relative to the base section 18 intermediate its opposite ends.

The various fluid motors 36, 40, 46, 50 and 58 may be operatively connected in suitable hydraulic circuits (not shown) provided with individual controls for extending and retracting the fluid motors. Also, the fluid motor 15 may be similarly connected to a suitable hydraulic circuit.

The lower ends of the jaws 52 and 54 include opposing jaw faces 100 and 102 which are semi-cylindrical and have their convex sides opposing each other. The jaw faces 100 and 102 may effectively engage opposite side portions of a pipe section disposed between the free ends of the jaws 52 and 54 upon extension of the fluid motor 58.

Figure 2:
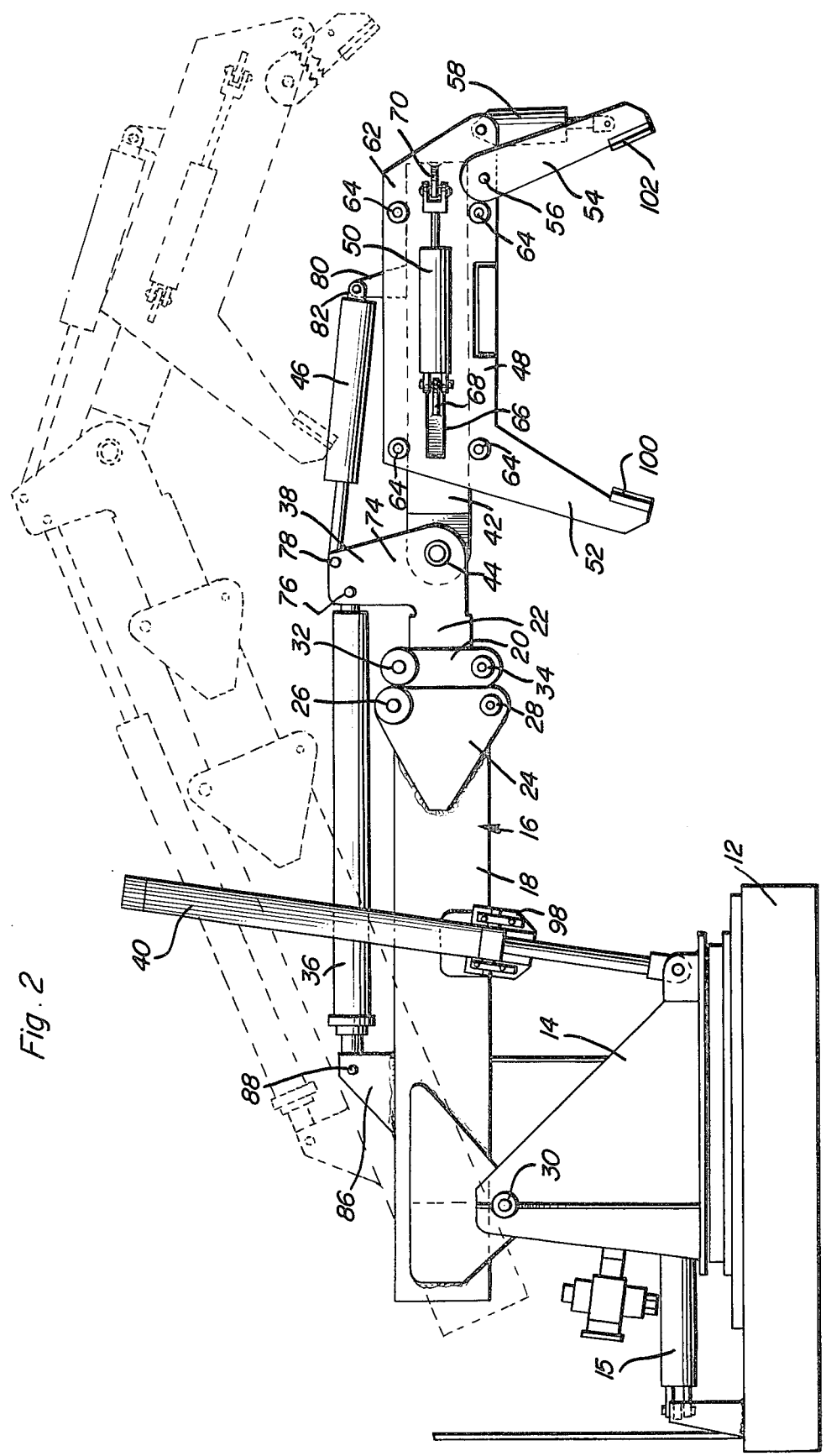
FIG. 2 is a side elevational view of the grapple crane with an alternate position of the boom, support arm and support arm mounted jaw thereof in alternate positions.

As may be noted from FIG. 2 of the drawings, the arm 42 may be adjusted to the inclined downwardly and outwardly relative to the boom assembly 16 when the latter is horizontal. In addition, it is to be noted that the support arm 42 may also be upwardly and outwardly inclined relative to the boom assembly 16 when the latter is horizontally disposed. Accordingly, if the boom asembly 16 is lowered to a downwardly and outwardly inclined position and the sections 20 and 22 are extended relative to the section 18 to reach down into a trench for receiving a pipe section engaged between the jaw faces 100 and 102, the arm 42 may be adjusted relative to the boom assembly 16 so as to be substantially horizontally disposed. After the desired height of the supported end of the associated pipe section is achieved and the arm 42 is positioned so as to be horizontally disposed, the fluid motor 50 may be extended or retracted in order to horizontally laterally displace the supported pipe end. In this manner, precise positioning of the supported end of the associated pipe section may be accomplished in order that the remote end of the pipe section may be properly aligned with and welded relative to the last laid pipe section.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A grapple crane including a mount, an elongated boom including an elongated base section and at least one elongated extension section telescopingly supported from said base section for shifting between extended and retracted positions relative to one end of said base section and defining a free end section of said boom, first motor means operatively connected between said base and said extension section for controllably shifting said extension section relative to said base section, means pivotally supporting the other end of said base section from said mount for oscillation relative thereto about a horizontal axis extending transversely of said base section, second motor means operatively connected between said base section and said mount for adjustably angularly positioning said base section relative to said mount, a generally horizontal elongated support arm having one end pivotally supported from the free end of said extension section for oscillation relative thereto about a horizontal axis extending transversely of said arm and extension section, third motor means operatively connected between said extension section and said support arm for limited adjustable angular displacement of said support arm relative to said extension section, an elongated follower guidingly mounted on said support arm for adjustable shifting therealong, fourth motor means operatively connected between said arm and said follower for adjustably shifting the follower along said arm, one end portion of said follower including a first elongated depending jaw supported therefrom facing toward the other end portion of said follower, a second elongated laterally depending jaw pivotally supported at its upper end portion from the other follower end portion for oscillation about an axis extending transversely of said follower and second jaw, and fifth motor means operatively connected between said follower and second jaw operative to adjustably angularly displace said second jaw relative to said follower, the lower end portions of said jaws including article engaging surfaces each facing toward the other jaw, said follower including a pair of opposite side plates between which said support arm is received, upper and lower pairs of longitudinally spaced rollers journaled between said plates and rollingly engaged with the upper and lower surfaces of said support arm, one of said plates including an elongated longitudinally extending slot, said support arm including a laterally outwardly projecting lug slidingly received in said slot, said fourth motor means being operatively connected between the outer end portion of said lug and said follower.

2. The combination of claim 1 wherein said one end portion of said follower comprises the end portion thereof remote from the outer end of said support arm.

3. The combination of claim 1 including a supporting portion, means mounting said mount from said supporting portion for angular displacement relative thereto about an upstanding axis, motor means operatively connected between said supporting portion and said mount for adjustably angularly displacing said mount relative to said supporting portion.

4. The combination of claim 1 wherein said boom includes an intermediate section telescopingly supported for extension and retraction relative to said base section and said free end section is telescopingly supported for extension and retraction relative to said intermediate section.

5. The combination of claim 1 wherein said first jaw is defined in part by depending opposite side end portions of said plates.

6. The combination of claim 5 wherein said second jaw has its upper end oscillatably supported from the outer free end portions of said plates.

7. A grapple crane including a mount, an elongated boom including an elongated base section and at least one elongated extension section telescopingly supported from said base section for shifting between extended and retracted positions relative to one end of said base section and defining a free end section of said boom, first motor means operatively connected between said base and said extension section for controllably shifting said extension section relative to said base section, means pivotally supporting the other end of said base section from said mount for oscillation relative thereto about a horizontal axis extending transversely of said base section, second motor means operatively connected between said base section and said mount for adjustably angularly positioning said base section relative to said mount, a generally horizontal elongated support arm having one end pivotally supported from the free end of said extension section for oscillation relative thereto about a horizontal axis extending transversely of said arm and extension section, third motor means operatively connected between said extension section and said support arm for limited adjustable angular displacement of said support arm relative to said extension section, an elongated follower guidingly mounted on said support arm for adjustable shifting therealong, fourth motor means operatively connected between said arm and said follower for adjustably shifting the follower along said arm, one end portion of said follower including a first elongated depending jaw supported therefrom facing toward the other end portion of said follower, a second elongated depending jaw pivotally supported at its upper end portion from the other follower end portion for oscillation about an axis extending transversely of said follower and second jaw, and fifth motor means operatively connected between said follower and second jaw operative to adjustably angularly displace said second jaw relative to said follower, the lower end portions of said jaws including article engaging surfaces each facing toward the other jaw, said follower including a pair of opposite side plates between which said support arm is received, upper and lower pairs of longitudinally spaced rollers journaled between said plates and rollingly engaged with the upper and lower surfaces of said support arm, said support arm including an upwardly projecting mounting lug spaced between and projecting upwardly from upper marginal portions of said plates, said fourth motor means including an elongated extensible fluid cylinder, one end of said fluid cylinder being pivotally mounted from said lug.

8. A grapple assembly including base structure, a support arm having one end pivotally supported from said base structure for oscillation relative thereto about an axis extending transversely of said support arm, motor means operatively connected between said arm and base structure for limited angular displacement of said support arm relative to said base structure, an elongated follower guidingly mounted on said support arm for adjustable shifting therealong, motor structure operatively connected between said support arm and follower for adjustably shifting the follower along said arm, one end portion of said follower including a first laterally outwardly projecting jaw supported therefrom facing toward the other end portion of said follower, a second elongated laterally outwardly projecting jaw pivotally supported at one end from the other follower end portion for oscillation relative thereto about an axis extending transversely of said follower and second jaw, said second jaw being swingable in a plane generally paralleling the first jaw with the second end of said second jaw swingable toward and away from the outer end of said first jaw during oscillation of said second jaw relative to said follower, additional motor means operatively connected between said follower and said second jaw operative to adjustably angularly displace said second jaw relative to said follower, said follower including a pair of opposite side plates between which said support arm is received, laterally spaced pairs of longitudinally spaced rollers journaled between said plates and opposing and rollingly engaged with opposite side longitudinal surfaces of said support arm, one of said plates including an elongated longitudinally extending slot, said support arm including a laterally outwardly projecting lug slidingly received in said slot, said motor structure being operatively connected between the outer end portion of said lug and said follower.

* * * * *